Patented Aug. 26, 1941

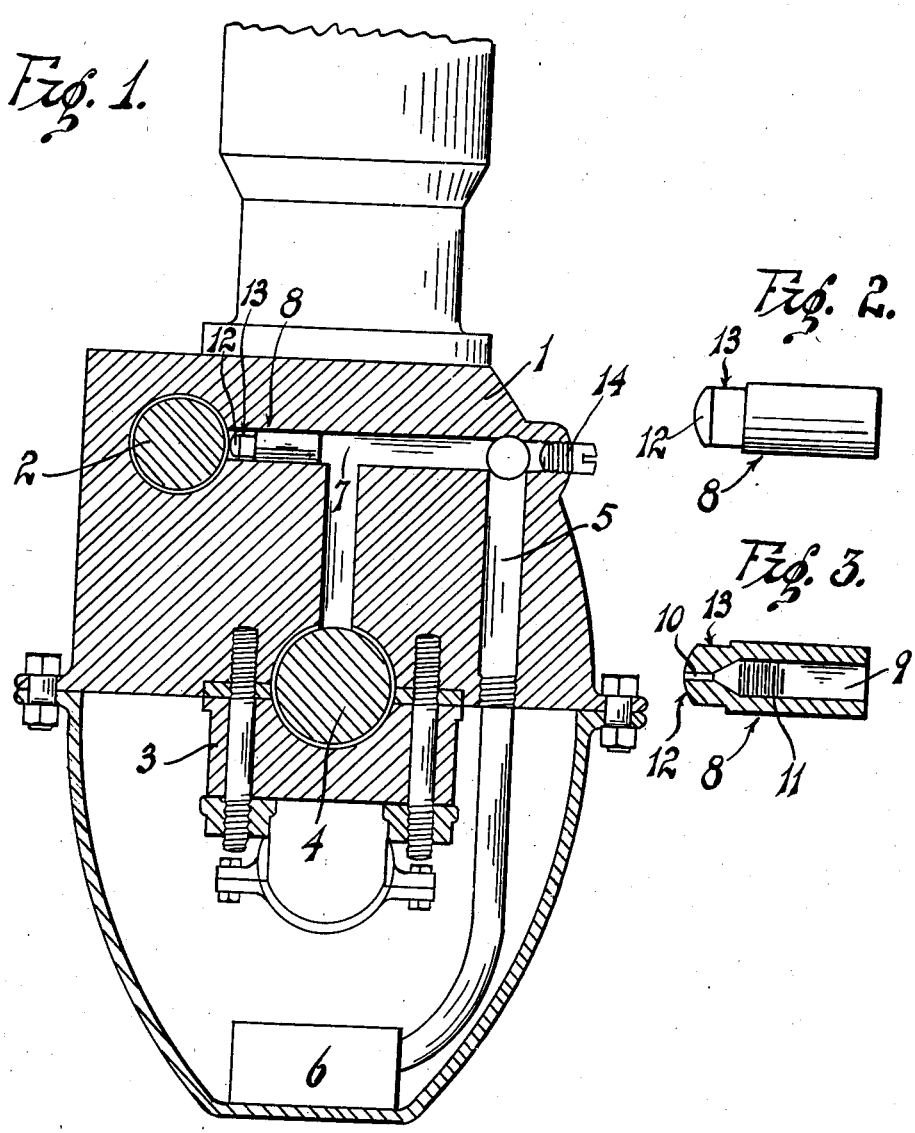

2,253,838

UNITED STATES PATENT OFFICE 2,253,838

OIL METERING JET FOR THE CAMSHAFTS OF ENGINES

Abram H. Blaisdell, Long Beach, Calif.

Application April 29, 1939, Serial No. 270,811

1 Claim. (Cl. 184—6)

This invention relates to an oil metering jet particularly applicable to the cam shafts of engines, which are lubricated by an oil pump, said pump forcing the oil through ducts to the cam shaft bearings.

An object of my invention is to provide a novel oil metering jet, which can be quickly and easily placed in the oil duct adjacent the cam shaft bearing, for the purpose of reducing the flow of oil to the cam shaft bearing and preventing the oil pressure loss at this point.

Another object of my invention is to provide a novel oil metering jet, which is simple in construction, easy to install, and effective in use.

Other objects, advantages and features of invention may appear from the accompanying drawing, the subjoined detailed description, and the appended claim.

In the drawing:

Figure 1 is a transverse sectional view of an engine, showing my oil metering jet in position in one of the oil ducts.

Figure 2 is a side elevation of the oil metering jet.

Figure 3 is a longitudinal sectional view of the same.

Referring more particularly to the drawing, the numeral 1 indicates the engine casting, and particularly the bearing portion of the casting which supports both the cam shaft 2 and the main bearings 3 of the crank shaft 4. In a multi-cylinder engine, the casting 1 is provided with transversely extending webs, Figure 1 being a sectional view through one of these webs. This construction is usual and well-known, and forms no part of this invention.

In the casting 1, there are provided oil ducts 5, which receive oil from the pump 6 located in the crank case of the engine, all of which is usual and well-known. A horizontal duct 7 is drilled in the casting 1 for the purpose of supplying oil to the bearing of the cam shaft 2. Due to the fact that these bearings are of the plain sleeve type, oil will leak past these sleeve bearings from the duct 7, causing an appreciable pressure drop in the oil system, which is detrimental to the engine. To prevent this pressure drop, I provide an oil metering jet 8, which is positioned in the duct 7 adjacent the cam shaft 2. This jet is cylindrical in shape and is provided with a longitudinally extending bore 9, and a small outlet port 10 in the end of the jet adjacent the cam shaft. The bore 9 may be provided with internal threads 11, so that a tool may be inserted in the duct 7 to remove the jet 8, if necessary. The leading end of the jet may be rounded, as shown at 12, so that the jet may more easily advance through the duct 7. The rear portion of the jet may also be reduced in diameter, as shown at 13, so that the jet may be compressed if the oil duct is irregular in diameter and having some spots of lesser diameter.

My oil metering jet is inserted in the duct 7 by removing the plug 14, and then forcing the jet along the duct to a point immediately adjacent the cam shaft 2.

A superior lubricating effect is obtained by disposing the jet, as aforesaid, immediately adjacent to the cam shaft. In this position it directs a small stream of oil forcibly upon a restricted area of said shaft, cleansing its surface in an efficient manner as well as lubricating it. In order to secure this result, the jet piece is placed so close to the cam shaft that the flow of the issuing stream of oil is somewhat retarded by the presence of said shaft.

Having described my invention, I claim:

The combination, with the engine casing, crank shaft, and cam shaft mounted upon said casing, said casing having within it oil ducts including a straight oil duct in an angularly opposed communicating relation to the interior of the bearing for the cam shaft, of an oil metering jet stationed in said straight duct, said jet having its discharge end disposed sufficiently close to said cam shaft to cause the presence of said shaft to retard the oil stream issuing from said jet.

ABRAM H. BLAISDELL.